(12) United States Patent
Walmsley et al.

(10) Patent No.: US 8,706,437 B2
(45) Date of Patent: Apr. 22, 2014

(54) CALIBRATION OF PARTICLE DETECTORS

(75) Inventors: Ian Alexander Walmsley, Oxford (GB); Brian John Smith, Oxford (GB); Jeffrey Stephen Lundeen, Oxford (GB); Peter James Mosley, Oxford (GB); Graciana Puentes, Oxford (GB); Hendrik Bernd Coldenstrodt-Ronge, Oxford (GB); Nicholas Lloyd Thomas-Peter, Oxford (GB); Andrew Philip Worsley, Oxford (GB)

(73) Assignee: Isis Innovation Limited, Oxford (GB)

( * ) Notice: Subject to any disclaimer, the term of this patent is extended or adjusted under 35 U.S.C. 154(b) by 424 days.

(21) Appl. No.: 13/123,497

(22) PCT Filed: Oct. 12, 2009

(86) PCT No.: PCT/GB2009/002441
§ 371 (c)(1),
(2), (4) Date: Jul. 19, 2011

(87) PCT Pub. No.: WO2010/041042
PCT Pub. Date: Apr. 15, 2010

(65) Prior Publication Data
US 2011/0276296 A1 Nov. 10, 2011

(30) Foreign Application Priority Data
Oct. 10, 2008 (GB) .................................. 0818643.9

(51) Int. Cl.
*G06F 19/00* (2011.01)
(52) U.S. Cl.
USPC .......................................... 702/85; 356/450
(58) Field of Classification Search
USPC .......................................... 702/85; 356/450
See application file for complete search history.

(56) References Cited

FOREIGN PATENT DOCUMENTS

RU 2030715 3/1995

OTHER PUBLICATIONS

Written Opinion and Search Report of International Application No. PCT/GB2009/002441 mailed Jan. 11, 2010.
"Absolute Calibration of Analog Detectors by Using Parametric Down Conversion", Brida et al., IEEE Trans. Instrum. Meas. 56 Issue 2, 275-279.
"Twin-photon techniques for photo-detector calibration", Brida et al., Laser Physics Letters, vol. 3, issue 3, 115-123.
"Measuring Measurement", Lundeen et al., http://arxiv.org/abs/0807.2444.
"Direct, Loss-Tolerant Characterization of Nonclassical Photon Statistics", Achilles et al., Physical Review Letters, V. 97, 043602, p. 1-4, Jul. 27, 2006.
"Photon-number-resolving detection using time-multiplexing", Achilles et al., International Quantum Elec Conference, San Francisco, CA, May 16, 2004.
"Homodyne state tomography with photon number resolving detectors", Graciana Puentes et al., Lasers and Electro-Optics, 2008. Cleo 2008., Conference IEEE, Piscataway, NJ, May 4, 2008.
"Full characterization of quantum optical detectors", Coldenstrodt-Ronge et al., CLEO/Pacific Rim 2009 Conference on IEEE Piscataway, NJ, Aug. 30, 2009, p. 1-2.

*Primary Examiner* — Jonathan C Teixeira Moffat
*Assistant Examiner* — Hien Vo
(74) *Attorney, Agent, or Firm* — Koppel, Patrick, Heybl & Philpott; Michael J. Ram

(57) ABSTRACT

A method of calibrating an optical detector arrangement (38, 42) comprises simultaneously generating a plurality of entangled photon pairs, such that one photon from each pair traverses a first path (36-38-42) and the other photon from each pair traverses a second path (36-40-44). The number of photons received along the first path is calculated using the detector arrangement (38,42), while the number of simultaneously-generated photons received along the second path is calculated using a second detector arrangement (40,44). These photon numbers are used to calculated an estimate of the detection efficiency (50) of the first detector arrangement (38,42).

26 Claims, 4 Drawing Sheets

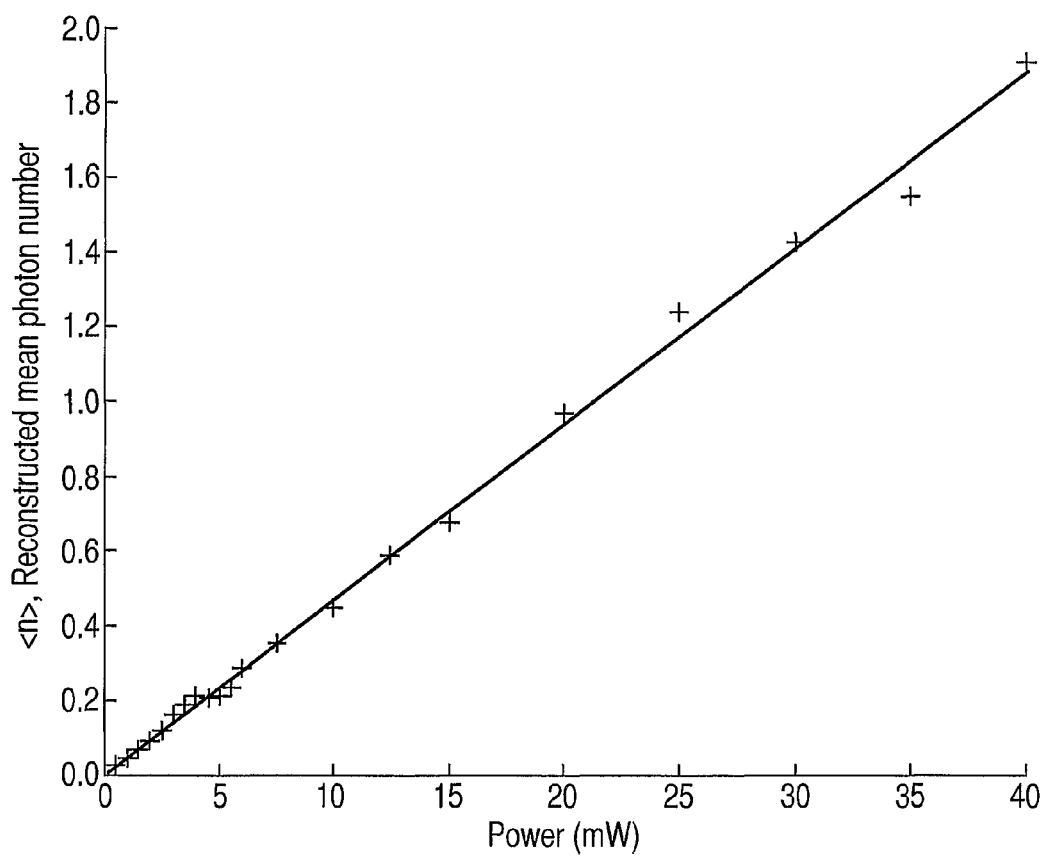

CALIBRATION OF PARTICLE DETECTORS

This is a National Stage Application of PCT/GB2009/002441 filed 12 Oct. 2009, published as WO2010/041042, and claiming priority from GB0818643.9, filed 10 Oct. 2008.

BACKGROUND

Field of the Invention

This invention relates to the calibration of detectors for a wide variety of particles. It relates particularly, but not exclusively, to optical detectors for measuring relatively small numbers of photons—i.e. very low light levels.

Calibration of optical detectors is necessary for many aspects of commerce—from laser applications in health science to museums that must monitor the radiation impinging upon ancient artefacts. However calibration of optical detectors has long been a difficult problem. Much of the revenue generated from various calibration techniques arises from the work of national laboratories throughout the world that are often the practitioners of detector standards. Typically detector calibration methods use previously characterized light sources to estimate the overall efficiency of such a detector. The drawback of this approach is that errors in the source brightness translate directly into errors in the detector efficiency calibration. The converse is also true, making detector and light source calibration a "chicken-and-egg"-style dilemma. To get around this, brightness calibration is typically based on a fundamental physical processes, for example, blackbody radiation of gold at its melting point, or heating of a cryogenic bolometer. Such methods are suitable for calibrating bright light sources. In contrast, calibration of detectors operating at the quantum level (few photons) using this method requires sources with powers on the order of a femtowatt to avoid saturation, which makes them extremely difficult to calibrate.

The ability to calibrate or characterise detectors and detector arrangements at the quantum level is important in several areas of quantum optics, where one can perform measurements that are more accurate than the fundamental limits of classical optics. Central to this capability are quantum optical detectors, those that are sufficiently sensitive to discern the inherent discreteness of light. These detectors are key to emerging quantum technologies such as quantum imaging and lithography, in which the standard wavelength limit is surpassed by using quantum states of light and photon-number sensitivity. However, the majority of quantum optical detectors have a response that saturates at only one photon, imposing a significant limitation on the brightness of the optical fields that can be used for such quantum technologies. The result of this binary detector response is a measurement that can only discriminate between zero photons and one or more photons arriving simultaneously; the detector produces an identical response for any number of photons greater than zero. To allow increased brightness of the light sources used in the technologies outlined above (and the concomitant improvement in accuracy that this brings), it is necessary to use detectors that can discern the number of photons incident simultaneously on the detector—a photon-number resolving detector (PNRD). However there is currently no convenient and accurate way for these to be calibrated which limits their usefulness.

A technique based on the quantum nature of light has been proposed to overcome the above-mentioned difficulties when measuring very low light levels using binary detectors. This technique is described in a paper by D. N. Klyshko, "Use of two-photon light for absolute calibration of photoelectric detectors," Sov. J. Quantum Electron. 10, 1112-1117 (1980) and in RU 2030715. This technique is hereinafter referred to as "the Klyshko method" and relies on spontaneous parametric down-conversion (SPDC) to generate simultaneous pairs of entangled photons which form two respective beams of light, known in the art as the signal and idler beams. The signal and idler beams are therefore perfectly correlated in photon number—that is, if n photons are present in the signal beam, then there are exactly n photons present in the idler beam. Detectors are placed to detect the photons in the signal and idler beams, each detector having a characteristic detection efficiency—the proportion of incident photons which are actually detected. The Klyshko method exploits the fact that photons are always produced in pairs to deduce that when a photon is detected in one detector but not the other this is a result of the imperfect detection efficiency. An estimate of the efficiency of a given detector can then be determined by examining the rate of detection at the other detector relative to the rate of detection at both detectors.

The concept of using photon-number correlated beams which is behind the Klyshko method has been utilized to determine the efficiency of binary optical detectors, where a detector event is registered when one or more photons are incident on the detector active area. However, these techniques make significant assumptions about the nature of the light source—in particular they assume that only individual photon pairs are emitted by the source (n=1), which is often a poor assumption, particularly when the power of the laser pump driving the source is increased. Indeed the inventors have recognised that there is an increasing need in experiments being done and planned in quantum information to make use of multiple simultaneous photon pairs and correspondingly that accurately calibrated detectors capable of resolving the number of photons received simultaneously are required.

Although detectors that are capable of resolving photon number are known, they cannot be accurately calibrated by the Klyshko method since this tends to overestimate the detection efficiency when multiple photons are received. It has been proposed to calibrate such detectors using the Klyshko method by attenuating multiple-photon beams, or reducing the power of the pump laser, sufficiently that only single photons are incident on the detectors. However this is undesirable as it does not give calibration in the ordinary operating range of the detector.

SUMMARY

When viewed from a first aspect the invention provides a method of calibrating a first optical detector arrangement comprising:

simultaneously generating a plurality of entangled photon pairs, such that one photon from each pair traverses a first path and the other photon from each pair traverses a second path;

using said detector arrangement to calculate the number of photons received along the first path;

using a second detector arrangement to calculate the number of simultaneously generated photons received along the second path; and using the calculated numbers of simultaneously generated photons having arrived along the first and second paths to calculate an estimate of the detection efficiency of the first detector arrangement.

The invention also extends to corresponding apparatus comprising:

a light source arranged to simultaneously generate a plurality of entangled photon pairs, such that one photon from each pair traverses a first path and the other photon from each pair traverses a second path;

a first detector arrangement for calculating the number of photons received along the first path;

a second detector arrangement for calculating the number of simultaneously generated photons received along the second path; and means for calculating an estimate of the detection efficiency of the first detector arrangement using the calculated numbers of simultaneously generated photons having arrived along the first and second paths.

The invention also extends to a computer software product for calibrating an optical detector arrangement comprising:

logic for receiving data representing a calculated number of photons received along a first path;

logic for receiving data representing a calculated number of simultaneously generated photons received along a second path; and logic for calculating an estimate of the detection efficiency of a detector arrangement detecting photons in the first path using the calculated numbers of simultaneously generated photons having arrived along the first and second paths.

Preferably the software product is adapted to store and/or display and/or communicate electronically said estimate of the detection efficiency.

Thus it will be seen by those skilled in the art that in accordance with the invention, rather than having to make the assumption that only a single photon pair is generated at once, the method in accordance with the invention explicitly makes use of the higher photon-number components of the probe beam in order to add multiple levels of redundancy in the estimation of efficiency of photon-number-resolving (PNR) detectors.

The multiple photon-number responses of PNR detectors and the photon-number correlations allow this approach to detector efficiency calibration to surpass previous techniques in both accuracy and photon-number-response range. In comparison to the Klyshko method the uncertainty in the estimated detection efficiency can be significantly reduced as the use of multiple-photon-number detections gives an increased number of relations between measurement outcomes and detector efficiencies. The use of photon-number-correlated light sources can also significantly reduce uncertainty in comparison to using a previously calibrated light source, which inevitably has an inherent luminous uncertainty. For example the working standards for luminous intensity calibration are based on comparing a detector under investigation to a cascade of standard detectors and show an accuracy of only about 0.5%. By contrast a proof-of-principle experiment carried out in accordance with the invention improved the absolute error of the detector calibration, to 0.4%.

The treatment of higher photon-number components in accordance with the invention also enables the in-situ calibration of photon counting detectors, when used in experiments using high photon numbers. This is often desirable, as in continuous-variable experiments.

It will be noted by those skilled in the art that although in accordance with the invention an assumption is made that entangled pairs of photons are generated which traverse the respective first and second paths, i.e. that there is perfect photon-number correlation between the twin beam paths, no further knowledge or assumption is required as to the photon-number distribution of the twin-beam state or even that it is pure. Despite this it has been found that detector efficiency can be calculated with a smaller absolute error than with prior art methods.

In accordance with the invention a twin-beam, photon-number-correlated light source is used to produce the simultaneous entangled photon pairs. There are several possible ways in which this could be realised. For example spontaneous four-wave mixing in optical fibers or other nonlinear processes could be employed. In presently preferred embodiments however preferably the method of the invention comprises generating said plurality of entangled photon pairs by spontaneous parametric down-conversion. Preferably the light source is selected from the group consisting of non-linear crystals, optical fibers, periodically poled waveguides and atomic gases. In a particular, non-limiting example, the light source comprises a potassium dihydrogen phosphate crystal pumped by a Ti:Sapphire laser.

In preferred embodiments therefore the invention builds upon the idea of utilizing the non-classical photon-number statistics arising from SPDC or other twin-beam photon-number correlated light sources to determine the detection efficiency of a detector arrangement. For example, using two photon-number-resolving detectors (characterized by their detector efficiencies $\eta_1$ and $\eta_2$) the joint state of the two photon-number-correlated beams from a SPDC source (characterized by a set of coefficients $\{c_j\}$, $j=1, 2, \ldots, N$, which represent the relative probability that the source emits pairs of j-photons, and where N is the maximum number of photon pairs emitted by the source) is measured. The measured joint outcome event statistics [$P_{meas}(n_1,n_2)$=probability of getting the $n_1$-event at detector 1 and the $n_2$-event at detector 2, where the $n_j$-event indicates $n_j$-clicks at detector $j=1,2$] specify the detector efficiencies $\eta_1$ and $\eta_2$) with large redundancy.

The outcome statistics reflecting the determined number of photons along each path are used in accordance with the invention to estimate the detection efficiency of the detector arrangement. This can be done a number of ways. In preferred embodiments a numerical optimization approach is used. In one set of preferred embodiments the difference between the measured outcome statistics, $P_{meas}(n_1,n_2)$, and the predicted outcome statistics $P_{theory}(n_1,n_2)$ is minimized using a least-squares estimation. The inventors have established that the solution space is convex and so such an estimation can converge on a unique solution. The solution given provides estimates of efficiency for both of the detectors. This can therefore be used either where both detectors are to be calibrated, or where the efficiency of one of the detectors is known and the other is to be calibrated, in which case the precision of the calibration should be further increased.

The detector arrangement may be just a detector, but may comprise a channel forming all or part of the path between the source and the detector. For example, the detector arrangement may include a length of optical fibre extending from the detector towards the source. If the detection efficiency of the detector itself is known, it will be appreciated by the skilled person that methods described herein may be used to calculate the transmission efficiency of some or all of the path between the source and the detector. Therefore, in some embodiments, methods of the invention comprise calculating an estimate of the transmission efficiency of a channel. This calculation might be performed in addition to estimating the detection efficiency of the detector arrangement (for example, simultaneously or as a subsequent step), but may alternatively be performed independently of any calibration of the detector, for example where an estimate of the detection efficiency of the detector is already known.

Thus, from a further aspect, the invention provides a method of characterising a first optical detector arrangement having a channel, comprising:

simultaneously generating a plurality of entangled photon pairs, such that one photon from each pair traverses a first path comprising the channel and the other photon from each pair traverses a second path;

using said detector arrangement to calculate the number of photons received along the first path;

using a second detector arrangement to calculate the number of simultaneously generated photons received along the second path; and using the calculated numbers of simultaneously generated photons having arrived along the first and second paths to calculate an estimate of the transmission efficiency of the channel.

This aspect extends to corresponding apparatus comprising:

a light source arranged to simultaneously generate a plurality of entangled photon pairs, such that one photon from each pair traverses a first path and the other photon from each pair traverses a second path;

a first detector arrangement, having a channel, for calculating the number of photons received along the first path;

a second detector arrangement for calculating the number of simultaneously generated photons received along the second path; and means for calculating an estimate of the transmission efficiency of the channel using the calculated numbers of simultaneously generated photons having arrived along the first and second paths.

The invention also extends to a computer software product for characterising a first optical detector arrangement having a channel, comprising:

logic for receiving data representing a calculated number of photons received along a first path comprising the channel;

logic for receiving data representing a calculated number of simultaneously generated photons received along a second path; and logic for calculating an estimate of the transmission efficiency of the channel using the calculated numbers of simultaneously generated photons having arrived along the first and second paths.

In some embodiments, an estimate of the transmission efficiency of the second path is already known, or an assumption as to its transmission efficiency may be made. The second path may be substantially shorter than the first path; for example, the second path may be a few centimeters long while the first path may be several kilometers long. The first path may be just the channel, or may be longer. If it is longer, the transmission efficiency of any components forming the additional length is preferably already known.

Whether characterising a channel or calibrating the detector arrangement, the predicted outcome statistics can be determined by a well-tested model of the photon number resolving detectors with efficiency and photon-number distribution as the only parameters as described in D. Achilles, C. Silberhorn, C. Sliwa, K. Banaszek, I. A. Walmsley, M. J. Fitch, B. C. Jacobs, T. B. Pittman, and J. D. Franson, "Photon-number-resolving detection using time-multiplexing," J. Mod. Opt. 51, 1499-1515 (2004); or by direct detector characterization as described in J. S. Lundeen, A. Fieto, H. Coldenstrodt-Ronge, K. L. Pregnell, C. Silberhorn, T. C. Ralph, J. Eisert, M. B. Plenio, and I. A. Walmsley, "Measuring Measurement," http://arxiv.org/abs/quant-ph/0807.2444.

The detector specified in accordance with the invention could be any photon-number-resolving detector. Some non-limiting examples include: photomultiplier tubes, nanowire superconducting detectors, visible light photon counters, intensified charge coupled devices, charge-integration photon detectors, superconducting single-photon detectors, transition edge sensors, quantum dot field effect transistors, integrated avalanche photodiode arrays, and time-multiplexed detectors.

Preferably the least-square estimation comprises using the Frobenius norm as the distance measure with the detector efficiencies and state coefficients as free parameters subject to normalization and physicality conditions.

In alternative embodiments this optimization procedure may be replaced by another technique such as maximum-entropy or maximum-likelihood estimation. These may be better if accuracy becomes an issue.

In preferred embodiments of the invention background compensation is carried out. One possibility is to treat the background radiation received by the detectors as a third degree of freedom in the numerical estimation, thereby exploiting the redundancy referred to hereinabove. However in presently preferred embodiments an independent quiescent radiation measurement is taken and subtracted from the raw click data from the detectors.

Although up to now the invention has been described in terms of optical, i.e. photon detectors, it also has application to the calibration of other counting detectors and detector arrangements, for example (and without limitation to): microchannel plates and arrayed electron-multiplier tubes used to count ions in particle experiments, or to the detection of electron-hole pairs in solid-state application. Thus when viewed from a further aspect the invention provides a method of calibrating a particle detector comprising:

generating first and second particle-number-correlated beams of particles;

using said detector to count a number of particles received in the first beam;

using a second detector to count a number of simultaneously generated particles received in the second beam; and using the determined numbers of simultaneously generated particles in the first and second beams to calculate an estimate of the detection efficiency of the detector.

This aspect of the invention also extends to corresponding apparatus comprising:

a particle source arranged to generate first and second particle-number-correlated beams of particles;

a first detector for counting a number of particles received in the first beam;

a second detector for counting a number of simultaneously generated particles received in the second beam; and means for using the determined numbers of simultaneously generated particles in the first and second beams to calculate an estimate of the detection efficiency of the first detector.

The invention also extends to a computer software product for calibrating a particle detector comprising: logic for receiving data representing a counted number of particles received in a first beam;

logic for receiving data representing a calculated number of simultaneously generated photons received in a second beam; and logic for calculating an estimate of the detection efficiency of a detector detecting particles in the first beam using the determined numbers of simultaneously generated particles in the first and second beams.

Preferably the software product is adapted to store and/or display and/or communicate electronically said estimate of the detection efficiency.

In accordance with this aspect of the invention the particle could therefore be a photon, electron, ion, or indeed any other fundamental or composite particle, charged or uncharged including quasi-particles such as phonons.

Similarly the methods of estimating transmission efficiency of a channel described herein are not limited to optical detector arrangements but have application to other such particles.

Any of the features described with reference to one aspect of the invention may, wherever appropriate, be used with any other aspect disclosed herein.

BRIEF DESCRIPTION OF THE DRAWINGS

An embodiment of the invention will now be described, by way of example only, with reference to the accompanying drawings, in which:

FIG. 8 is a graph of average reconstructed photon number against pump power.

DETAILED DESCRIPTION

Experimental Set-Up

Figure 1:
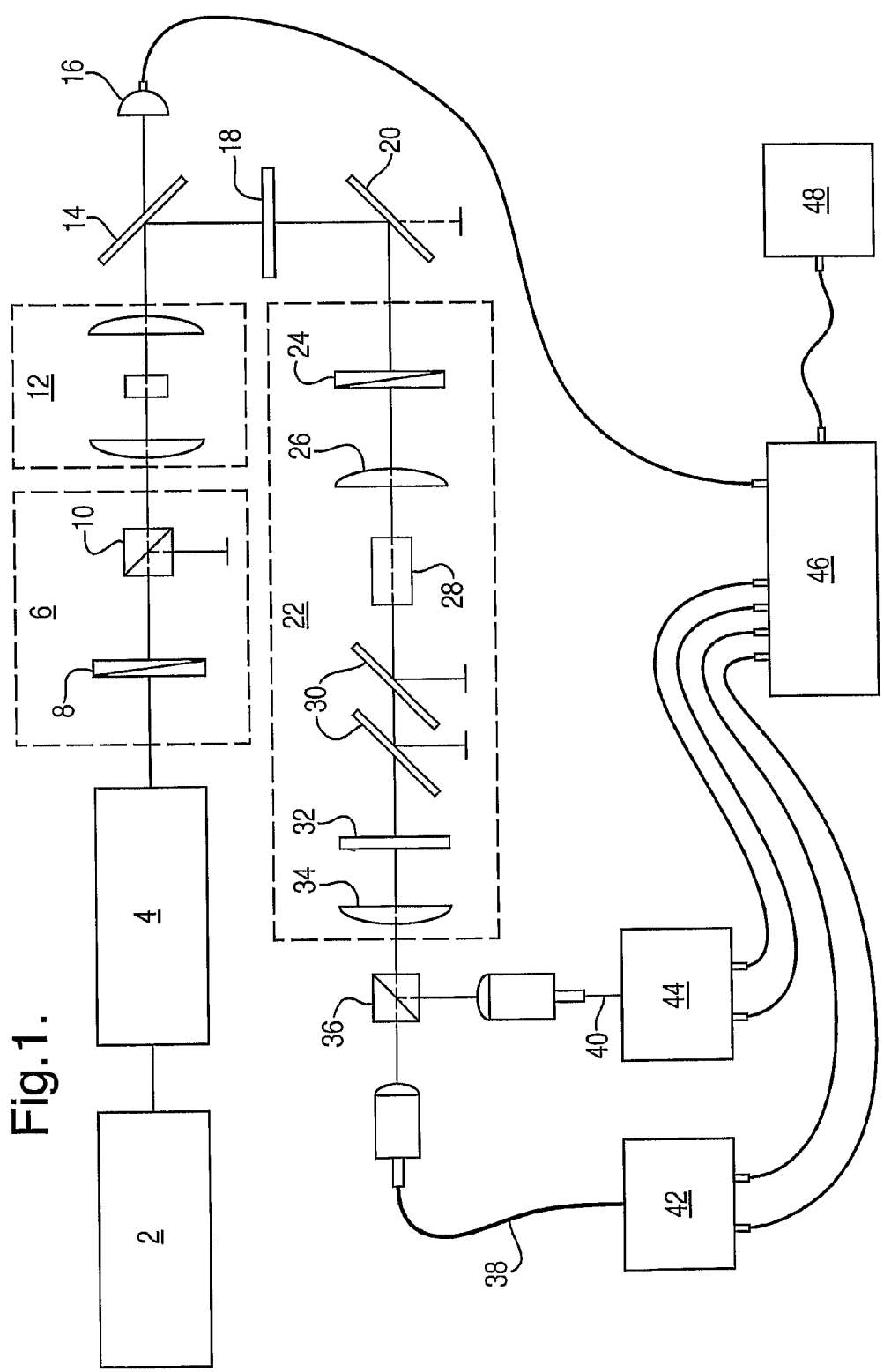
FIG. 1 is a schematic diagram of an experimental set-up in accordance with the invention.

FIG. 1 shows, in schematic form, an experimental set-up according to the invention, based on a nearly-two-mode spontaneous parametric down-conversion (SPDC) source.

A frequency-doubled, amplified Ti:Sapphire laser 2, operating with a 80 MHz repetition rate, provides a pulsed pump (415 nm central wavelength) to drive a potassium dihydrogen phosphate (KDP) nonlinear crystal (cut for type-II, collinear phase-matching) SPDC source. The output of the Ti:Sapphire laser 2 is first amplified by an amplifier 4 (operating at a repetition rate of 250 kHz) and then passes through an optical power control 6, which comprises a half-wave plate 8 and a polarizing beam splitter 10.

The output of the optical power control 6 then passes through a second-harmonic generation component 12 comprising a beta-barium borate crystal. Following this, a dichroic mirror 14 is used to send a pick off beam to a fast photodiode 16. The photodiode is connected to the detection electronics 46 in order to provide a trigger signal.

The main beam then passes through a blue-pass filter 18 and a further dichroic mirror 20 into the main parametric down-conversion stage 22. This comprises, in order: a half wave plate 24, a lens 26, the potassium dihydrogen phosphate nonlinear crystal 28, two dichroic mirrors 30, a red-pass colour glass filter 32 and a further lens 34. The dichroic mirrors 30 and the filter 32 separate the blue pump from the near-infrared (830 nm central wavelength) SPDC light.

The output of the parametric down-conversion stage 22 is split by a polarizing beam splitter 36 in order to separate a first beam and a second beam, and to direct the two co-propagating down-conversion beams into respective first 38 and second 40 single-mode fibres connected to respective first and second time-multiplexed photon-number-resolving detectors 42, 44. The two generated beams propagate collinearly and are orthogonally polarized.

In a time-multiplexed detector, the input optical state is contained in a pulsed wave-packet mode. The pulse is split into two spatial and several temporal modes by a network of fibre beam splitters and then registered using two avalanche photodiodes (APD). Avalanche photodiodes produce largely the same response for one or more incident photons. The time-multiplexed detector overcomes this binary response by making it likely that photons in the input pulse separate into distinct modes and are thus individually registered by the avalanche photodiodes. The time-multiplexed detector is a well-developed technology. The convolution matrix C for this detection scheme is calculated from a classical model of the detector using the fibre splitting ratios, and is also reconstructed using detector tomography. Loss effects in time-multiplexed detectors have also been thoroughly investigated.

The time-multiplexed detectors 42, 44 in the present embodiment employ four time bins in each of two spatial modes, resolving up to eight photons, with a possible input pulse repetition rate of up to 1 MHz. A field-programmable gate-array (FPGA) 46 is connected to the detector 42, 44 outputs and is arranged to time-gate the avalanche photodiode signals from the detectors 42, 44 using a window of 4 nanoseconds. This significantly cuts background rates. The joint count statistics R are accumulated by the electronics in the FPGA 46 and transferred to a computer 48 for data analysis.

The joint statistics R of the two time-multiplexed detectors 42, 44 are recorded for a range of pump powers between 1 and 55 mW in order to estimate the two time-multiplexed detector efficiencies at each power.

Data Analysis

Photon-number resolving detectors (PNRDs), such as the detectors 42, 44 used in the embodiment described above, have a unique response for every input photon-number state within their range. Ideally these responses can be perfectly discriminated. However, non-unit efficiency of realistic detectors causes these responses to overlap, and thus not allow for direct photon-number discrimination. Overlap can also arise from the detector electronics (e.g. amplification) or the underlying detector design. Despite this overlap, the linear relationship between the detector response and the input state allows for the reconstruction of the input photon statistics from the measured outcome statistics. This linear relationship is encapsulated by $$P_n = Tr[\hat{\rho}\hat{\Pi}_n] \quad (1)$$

where $\hat{\rho}$ is the input state density matrix, $P_n$ is the probability for the nth measurement outcome and $\hat{\Pi}_n$ is the associated positive operator value measurement (POVM) operator. Since PNRDs do not contain an optical phase-reference, the off-diagonal elements of $\hat{\Pi}_n$ are zero, meaning the photon-number resolving detection is insensitive to off-diagonal elements in $\hat{\rho}$. It is thus useful to write the diagonal elements of $\hat{\rho}$, the photon-number statistics, as a vector $\vec{\sigma}$. Similarly, the outcome probabilities $\{P_i\}$ can be written as a vector $\vec{p}$. In the following, $\vec{\sigma}$ is truncated at photon number N−1, where N is the number of detector outcomes, although this is not strictly necessary.

The positive operator value measurement operators of a general PNRD can be modelled by dividing the detector imperfection into two components: efficiency and detector design. Detector efficiency η can be modelled by a preceding optical loss of (1−η). In the context of a PNRD, the process of loss causes $\vec{\sigma} \to L(\eta)\vec{\sigma}$ where $$L_{i,j}(\eta) = \binom{j}{i}\eta^i(1-\eta)^{j-i} \quad \text{if } j \geq i$$

$$L_{i,j}(\eta) = 0 \quad \text{otherwise.}$$

These matrix elements transform the state by lowering photon numbers from j to i, representing the loss of photons through a binomial process with probability 1−η.

Although the detector-design component of the model depends on the detailed functioning of the device, a large class of PNRDs, mode-multiplexers, can be treated in the same way. These detectors split an input optical mode into many spatial and/or temporal modes and then use single-photon detection in each mode to achieve number resolution. Examples include nanowire superconducting detectors, visible light photon counters (VLPC), intensified CCDs, integrated avalanche photodiode (APD) arrays, and time-multiplexed detectors (TMD). All of these detectors suffer from detector saturation; i.e. the one-photon detector response occurs if two photons end up in the same mode. This saturation effect is modelled by the detector design component given by the convolution matrix C for a TMD. The form of C depends on relatively few parameters (compared to the positive operator value measurement set $\{\hat{\Pi}_i\}$) comprising the splitting ratio of the input mode into each of the multiplexed modes and the total number of these modes. Combining the action of both model components, C and L(η), gives $$\vec{p} = C \cdot L(\eta) \cdot \vec{\sigma} \quad (2)$$

This is a matrix formulation of equation (1) in which the ith row of C·L(η) are the diagonals of the ith operator in the positive operator value measurement set $\{\hat{\Pi}_i\}$.

With PNRDs in two beams one can not only measure the individual photon-number statistics $\vec{\sigma}_1$ and $\vec{\sigma}_2$, but also the joint photon-number distribution of these two beams. This distribution is written as the joint photon statistics matrix σ, where $\sigma_{m,n}$ is the probability of simultaneously having m photons in mode 1 and n photons in mode 2.

Equation (2) can be extended to relate the probability $P_{m,n}$ of getting outcome m at the first detector 42 and outcome n at the second detector 44 to the joint photon statistics σ as follows $$P = C_1 \cdot L(\eta_1) \cdot \sigma \cdot L^T(\eta_2) \cdot C_2^T \quad (3)$$

where subscripts indicate the relevant detector (first 42 or second 44) and $^T$ indicates the transpose. Joint photon statistics are a measure of photon-number correlations in the first and second beams and are thus sensitive to loss.

Photons are typically generated in many spectral and spatial modes in the signal and idler beams. Depending on the number of modes in the beams, the thermal photon-number distribution becomes a Poisson distribution. However, the number of photons remains perfectly correlated between the two beams. Without access to the number of generated modes, all that can be assumed about the joint photon statistics of the source is that $$\sigma_{m,n} = c_m \cdot \delta_{m,n} \quad (4)$$

where $\{c_i\}$ are arbitrary up to a normalization and $\delta_{m,n}$ is the Kronecker delta.

The joint photon statistics defined by equation (4) can be combined with equation (3). Since $C_1$ and $C_2$ of the detectors 42,44 are known, the predicted outcome probabilities P are highly constrained, having $N^2$ elements uniquely defined by the N parameters in $\{c_i\}$ and the two efficiencies $\eta_1$ and $\eta_2$ for the respective detectors. Consequently, a measurement of the outcome statistics specifies $\eta_1$ and $\eta_2$ with a large amount of redundancy; i.e. the efficiencies are overdetermined.

To correctly incorporate all measured outcome statistics into the efficiency estimates, a numerical optimization approach is used. This involves minimising the difference G between the measured outcome statistics R and the predicted outcome statistics P (which are determined by $\{c_i\}$, $\eta_1$ and $\eta_2$):

$$G = R - C_1 \cdot L(\eta_1) \cdot \sigma \cdot L^T(\eta_2) \cdot C_2^T$$

This is done by minimizing the Frobenius norm $F = \{Tr[(G)^2]\}^{1/2}$ to find the optimal $\eta_1$ and $\eta_2$ (the efficiency estimates of the respective first 42 and second 44 PNRDs). Using the Frobenius norm makes this a least-squares optimization over $\{c_i\}$, $\eta_1$ and $\eta_2$, where $0 \leq \eta_1, \eta_2 \leq 1$.

Of course, the person skilled in the art will appreciate that other optimization techniques, such as maximum entropy or maximum likelihood estimation, may be used instead of a least-squares approach.

The assumption that the efficiency estimation is a convex problem (i.e. will converge on a unique solution) can be justified empirically by simulating a variety of measured statistics and testing for a single minimum.

Results

Figure 2:
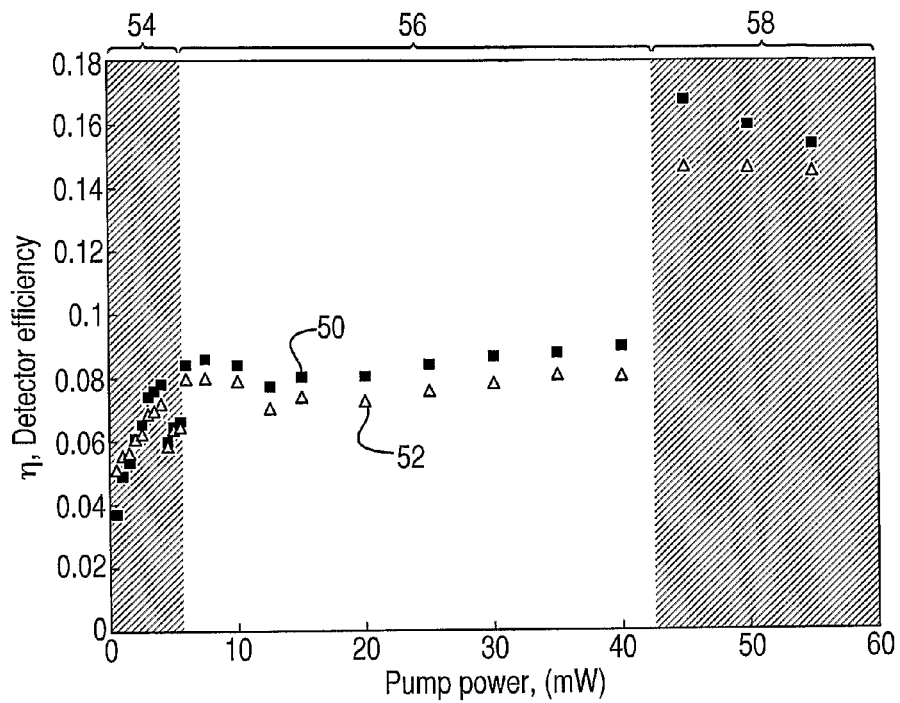
FIG. 2 is a graph of estimated efficiency against pump power.

FIG. 2 shows a graph of the estimated efficiencies of the two photon-number resolving detectors 42, 44 against average pump power. The square marks 50 indicate the estimated efficiency of the first detector 42 at a range of pump powers, and the triangular marks 52 indicate the estimated efficiency of the second detector 44 at the same powers.

Three different regions 54,56,58 are observed. At low powers (up to 6 mW), in the first region 54, the estimated efficiency increases with power. Between powers of 6 and 40 mW, in the second region 56, the estimates appear substantially constant. At 40 mW, the start of third region 58, there is a sudden jump in the estimated efficiency to approximately twice the previous value; above this power the estimates remain substantially constant.

The jump is due to the second-harmonic generation process qualitatively changing its behaviour at 40 mW: the increased pump power induces unwanted higher-order non-linear effects, resulting in the generation of additional frequency components other than the second harmonic and a change in the spatial mode structure. This changes both the transmission of the short wave pass filter 18,20 and the efficiency of the fibre 38,40 coupling into the detectors 42,44. Results in the third region 58 are thus ignored.

The efficiency of the time-multiplexed detectors 42,44 would be expected to be independent of the average photon number of the state and thus independent of the pump power. This is indeed the case in the second region 56 but not in the first region 54.

By reconstructing the joint photon-number distribution of the input state ($\sigma_{m,n}$) using the estimated efficiencies one can gain insight into the estimation accuracy of the detector efficiency. This serves as a partial check for the assumption that the number of photons in the two beams is equal.

Figure 3:
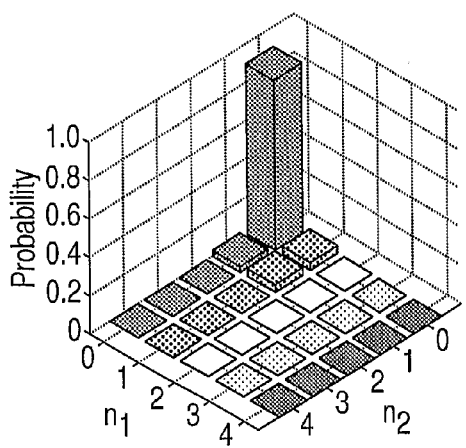
FIG. 3 is a plot of reconstructed joint photon statistics at low power.
Figure 4:
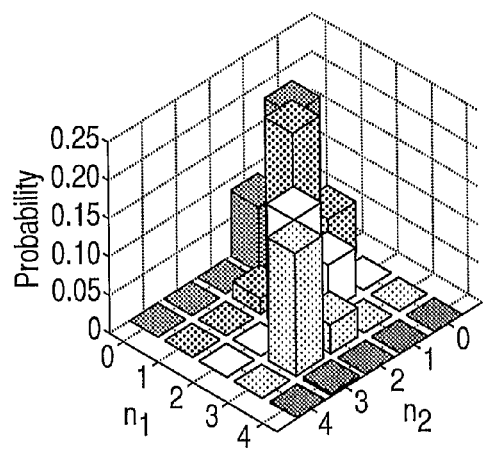
FIG. 4 is a plot of reconstructed joint photon statistics at higher power.

FIG. 3 shows the reconstructed joint photon statistics σ for $n_1$ and $n_2$ photons in the first and second beams respectively at a pump power of 1.5 mW (i.e. in the first region 54). FIG. 4 shows the reconstructed joint photon statistics σ for $n_1$ and $n_2$ photons in the first and second beams respectively at a pump power of 30 mW (i.e. in the second region 56). In FIG. 4, the photon-number distribution is largely diagonal: only 10% of the incident photons arrive without a partner in the other beam. In contrast, the state in FIG. 3 has significant off-diagonal components, with 43% of the photons arriving alone. This suggests that at low powers the reference state is corrupted by background photons, possibly fluorescence from optics in the pump beam path, pump photons leaking through the filters 30,32, or scattered pump photons penetrating the fibre coatings. Contributions from dark counts are expected to be negligible, since the specified dark count rates of the detectors 42,44 are significantly lower than these other effects.

The estimate of the detector efficiency can be improved by correcting for background light by subtracting an independently measured background contribution from the outcome statistics for each detector.

For each pump power the pump polarization is rotated by 90 degrees, extinguishing the SPDC source 22 and allowing the measurement of the joint outcome statistics due to background light alone. The background outcome statistics $P_B$ and the twin-beam outcome statistics $P_S$ are not independent: they interact due to the strong detection nonlinearity of the APDs (i.e. the detectors saturate at one photon). Consequently the outcome probabilities $P_M$ of both light sources combined is not a simple convolution of $P_S$ and $P_B$.

This saturation effect can be eliminated, however, by first applying the inverse of the C matrices to the measured statistics, $$P_M' = C_1^{-1} P_M (C_2^T)^{-1},$$

$$P_B' = C_1^{-1} P_B (C_2^T)^{-1},$$

so that $$P_M' = (C_1^{-1} P_S (C_2^T)^{-1}) * P_B'.$$

The convolution theorem can then be used to find $$P_S = C_1 \mathfrak{F}^{-1}\left\{\frac{\mathfrak{F}\{P_M'\}}{\mathfrak{F}\{P_B'\}}\right\} C_2^T$$

where $\mathfrak{F}$ indicates the Fourier transform, and the matrix division is element by element. Using $P_S$, the efficiency can be estimated using the above-described methods.

Figure 5:
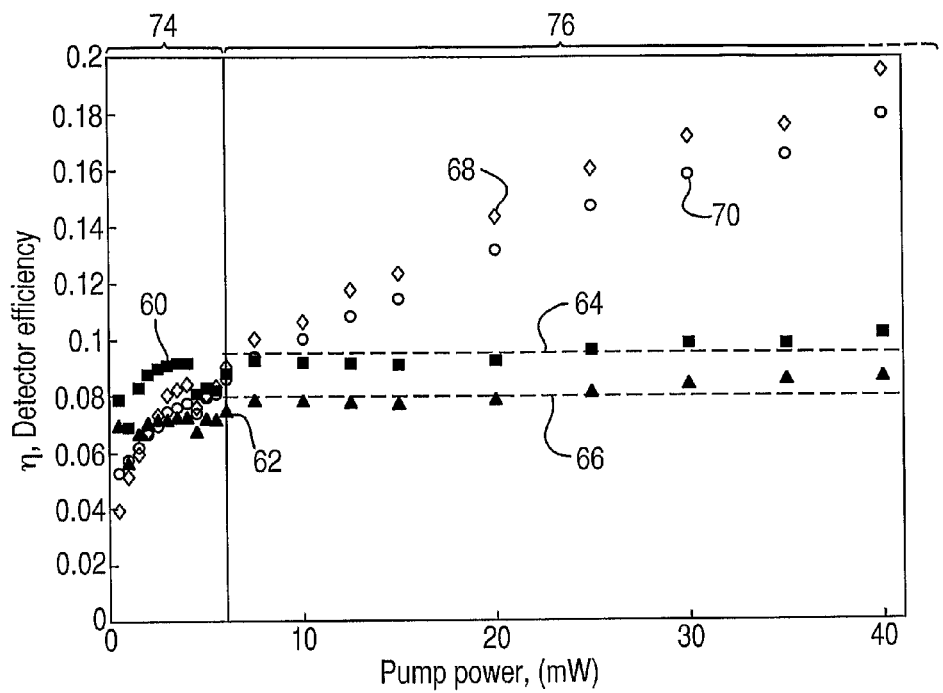
FIG. 5 is a graph of estimated efficiency against pump power corrected for background and a comparison to the Klyshko method.

FIG. 5 shows a graph of the background-subtracted estimated efficiencies of the two photon-number resolving detectors 42, 44 against average pump power, using the same average pump powers as FIG. 2. The square marks 60 indicate the background-corrected estimated efficiency of the first detector 42, and the triangular marks 62 indicate the background-corrected estimated efficiency of the second detector 44.

Two different regions are still observed: a first, low-power region 74 corresponding to the first region 54 of FIG. 2, and a second, higher-power region 76 corresponding to the second region 56 of FIG. 2. Nonetheless, it is evident that the background-compensated efficiencies are much closer to the hypothesised uniform efficiency across pump powers, as indicated in FIG. 5 by first and second horizontal lines 64,66 (for the first 42 and second 44 detectors respectively). There is also now better agreement through the first 74 and second 76 regions. The estimates still drop off as the power goes very low, but this would be expected since errors in background measurements are more significant at low powers, since background then forms a larger component of the outcome statistics.

Also shown in FIG. 5 are the first 68 and second 70 detector efficiencies as estimated using the Klyshko method. In contrast to the increased dynamic range of the present method, the standard Klyshko efficiency estimate increases with pump power, demonstrating that higher photon numbers in the input beams distort the estimated efficiency using the Klyshko method.

The average efficiency across the second region 76 is found to be 9.4%±0.4% for the first detector 42 and 8.0%±0.4% for the second detector 44, where the errors are the standard deviations. These relatively low efficiencies are only partly due to the quantum efficiency of the avalanche photodiodes themselves, which is specified to be 60%±5% at the relevant wavelength. The difference is accounted for in that bulk crystal SPDC sources ordinarily emit into many spatial modes, which makes coupling into a single-mode fibre difficult and inefficient (typical coupling efficiencies are less than 30%).

Figure 6:
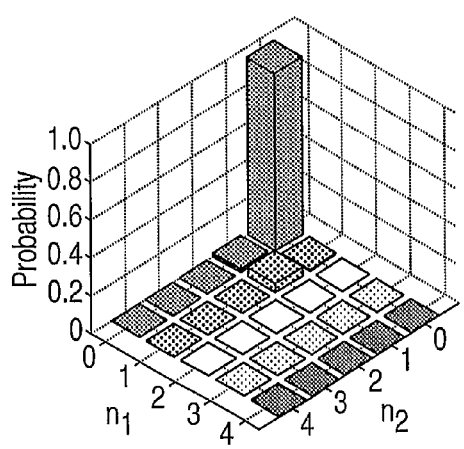
FIG. 6 is a plot of background-corrected reconstructed joint photon statistics at low power.
Figure 7:
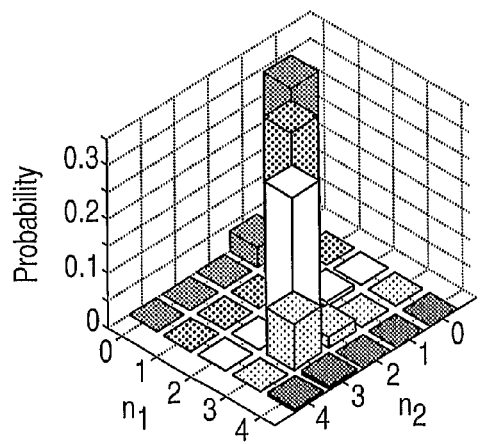
FIG. 7 is a plot of background-corrected reconstructed joint photon statistics at higher power.

FIG. 6 shows the reconstructed joint photon statistics a for $n_1$ and $n_2$ photons in the first and second beams respectively at a pump power of 1.5 mW (i.e. in the first region 74) after subtracting an independently-measured background. FIG. 7 shows the reconstructed joint photon statistics a for $n_1$ and $n_2$ photons in the first and second beams respectively at a pump power of 30 mW (i.e. in the second region 56) after subtracting an independently-measured background. These figures demonstrate the accuracy of the background subtraction method: in FIG. 6, now only 16% of incident photons are not part of a pair; and in FIG. 7 this drops to 4%.

FIG. 8 shows a graph of the average reconstructed photon number as a function of pump power. This provides a further check of the reconstructed photon statistics: the relationship is linear, as would be expected taking into account the higher dynamic range of a TMD in comparison to standard APDs.

Thus it will be seen from the embodiment described above that significantly more accurate calibration of PNR detectors can be achieved than hitherto, particularly the calibration of in-situ detectors operating at higher photon numbers. This is advantageous in helping to open up the use of PNR detectors in a wide variety of fields.

It will be appreciated by those skilled in the art however that the invention is not limited to optical detectors. The principles disclosed herein can be applied to detectors of many other types of particles such as electron/hole pairs, ions etc.

The invention claimed is:

1. A method of calibrating a first optical detector arrangement comprising:
   simultaneously generating a plurality of entangled photon pairs, such that one photon from each pair traverses a first path and the other photon from each pair traverses a second path;
   using the first optical detector arrangement to calculate a number of photons received along the first path;
   using a second optical detector arrangement to calculate a number of simultaneously generated photons received along the second path; and
   using the calculated numbers of simultaneously generated photons having arrived along the first and second paths to calculate an estimate of the detection efficiency of the first optical detector arrangement by determining joint count statistics for the first and second detector arrangements and using the joint count statistics to calculate the estimate of the detection efficiency of the first optical detector arrangement.

2. The method of claim 1 further comprising generating the plurality of entangled photon pairs by spontaneous parametric down-conversion.

3. The method of claim 2 further comprising using a light source selected from the group consisting of: non-linear crystals, optical fibers, periodically poled waveguides and atomic gases.

4. The method of claim 2 further comprising using a light source comprising a potassium dihydrogen phosphate crystal pumped by a Ti:Sapphire laser.

5. The method of claim 1 further comprising calculating the estimate of the detection efficiency of the first optical detector arrangement by minimizing a difference between measured outcome statistics comprising the calculated numbers of simultaneously generated photons and predicted outcome statistics, using a least-squares estimation.

6. The method of claim 5 further comprising using the Frobenius norm as a distance measure, with the detection efficiency of the first optical detector arrangements, the detection efficiency of the second optical detector arrangement, and state coefficients as free parameters, subject to normalization and physicality conditions.

7. The method of claim 1 wherein the first detector arrangement comprises a channel, the method further comprising estimating the transmission efficiency of the channel.

8. A method of calibrating a first optical detector arrangement comprising:
   simultaneously generating a plurality of entangled photon pairs, such that one photon from each pair traverses a first path and the other photon from each pair traverses a second path;
   using the first optical detector arrangement to calculate a number of photons received along the first path;
   using a second optical detector arrangement to calculate a number of simultaneously generated photons received along the second path;
   using the calculated numbers of simultaneously generated photons having arrived along the first and second paths to calculate an estimate of the detection efficiency of the first optical detector arrangement; and
   using the calculated numbers of simultaneously generated photons having arrived along the first and second paths to calculate an estimate of the detection efficiency of the second detector arrangement.

9. The method of claim 8 further comprising generating the plurality of entangled photon pairs by spontaneous parametric down-conversion.

10. The method of claim 9 further comprising using a light source selected from the group consisting of: non-linear crystals, optical fibers, periodically poled waveguides and atomic gases.

11. The method of claim 9 further comprising using a light source comprising a potassium dihydrogen phosphate crystal pumped by a Ti:Sapphire laser.

12. The method of claim 8 further comprising calculating the estimate of the detection efficiency of the first optical detector arrangement by minimizing a difference between measured outcome statistics comprising the calculated numbers of simultaneously generated photons and predicted outcome statistics, using a least-squares estimation.

13. The method of claim 12 further comprising using the Frobenius norm as a distance measure, with the detection efficiency of the first optical detector arrangements, the detection efficiency of the second optical detector arrangement, and state coefficients as free parameters, subject to normalization and physicality conditions.

14. The method of claim 8 wherein the first detector arrangement comprises a channel, the method further comprising estimating the transmission efficiency of the channel.

15. Apparatus comprising:
   a light source arranged to simultaneously generate a plurality of entangled photon pairs, such that one photon from each pair traverses a first path and the other photon from each pair traverses a second path;
   a first detector arrangement for calculating a number of photons received along the first path;
   a second detector arrangement for calculating a number of simultaneously generated photons received along the second path; and
   logic for calculating an estimate of the detection efficiency of the first detector arrangement using the calculated numbers of simultaneously generated photons having arrived along the first and second paths by determining joint count statistics for the first and second detector arrangements and using the joint count statistics to calculate the estimate of the detection efficiency of the first optical detector arrangement.

16. The apparatus of claim 15 wherein the light source comprises a potassium dihydrogen phosphate crystal arranged to be pumped by a Ti:Sapphire laser.

17. The apparatus of claim 15 further comprising logic for calculating the estimate of the detection efficiency of the first optical detector arrangement by minimizing a difference between measured outcome statistics comprising the calculated numbers of simultaneously generated photons and predicted outcome statistics, using a least-squares estimation, and using the Frobenius norm as a distance measure, with the detection efficiency of the first optical detector arrangements, the detection efficiency of the second optical detector arrangement, and state coefficients as free parameters, subject to normalization and physicality conditions.

18. The apparatus of claim 15 wherein the first detector arrangement comprises a channel, and the apparatus comprises logic for estimating the transmission efficiency of the channel.

19. Apparatus comprising:
   a light source arranged to simultaneously generate a plurality of entangled photon pairs, such that one photon from each pair traverses a first path and the other photon from each pair traverses a second path;
   a first detector arrangement for calculating a number of photons received along the first path;
   a second detector arrangement for calculating a number of simultaneously generated photons received along the second path;
   logic for calculating an estimate of the detection efficiency of the first detector arrangement using the calculated numbers of simultaneously generated photons having arrived along the first and second paths; and
   logic for using the calculated numbers of simultaneously generated photons having arrived along the first and second paths to calculate an estimate of the detection efficiency of the second detector arrangement.

20. The apparatus of claim 19 wherein the light source comprises a potassium dihydrogen phosphate crystal arranged to be pumped by a Ti:Sapphire laser.

21. The apparatus of claim 19 further comprising logic for calculating the estimate of the detection efficiency of the first optical detector arrangement by minimizing a difference between measured outcome statistics comprising the calculated numbers of simultaneously generated photons and predicted outcome statistics, using a least-squares estimation, and using the Frobenius norm as a distance measure, with the detection efficiency of the first optical detector arrangements, the detection efficiency of the second optical detector arrangement, and state coefficients as free parameters, subject to normalization and physicality conditions.

22. The apparatus of claim 19 wherein the first detector arrangement comprises a channel, and the apparatus comprises logic for estimating the transmission efficiency of the channel.

23. A non-transitory computer-readable medium containing computer instructions stored therein for calibrating an optical detector arrangement by:
  receiving data representing a calculated number of photons received along a first path;
  receiving data representing a calculated number of simultaneously generated photons received along a second path; and
  calculating an estimate of the detection efficiency of a detector arrangement detecting photons in the first path using the calculated numbers of simultaneously generated photons having arrived along the first and second paths by determining joint count statistics for the first and second detector arrangements and using the joint count statistics to calculate the estimate of the detection efficiency of the first optical detector arrangement.

24. The non-transitory computer-readable medium of claim 23 containing computer instructions stored therein for storing, or displaying, or communicating electronically, the estimate of the detection efficiency of the first optical detector arrangement.

25. A non-transitory computer-readable medium containing computer instructions stored therein for calibrating an optical detector arrangement by:
  receiving data representing a calculated number of photons received along a first path;
  receiving data representing a calculated number of simultaneously generated photons received along a second path;
  calculating an estimate of the detection efficiency of a first detector arrangement detecting photons in the first path using the calculated numbers of simultaneously generated photons having arrived along the first and second paths; and
  calculating an estimate of the detection efficiency of a second detector arrangement detecting photons in the second path using the calculated numbers of simultaneously generated photons having arrived along the first and second paths.

26. The non-transitory computer-readable medium of claim 25 containing computer instructions stored therein for storing, or displaying, or communicating electronically, the estimates of the detection efficiencies of the first and second optical detector arrangement.

* * * * *